Sept. 3, 1968  W. O. STADLIN  3,400,258
ECONOMIC CONTROL OF POWER POOLS
Filed Nov. 29, 1963  3 Sheets-Sheet 1

3,400,258
ECONOMIC CONTROL OF POWER POOLS
Walter O. Stadlin, Eagleville, Pa., assignor to Leeds & Northrup Company, a corporation of Pennsylvania
Filed Nov. 29, 1963, Ser. No. 326,662
10 Claims. (Cl. 235—151.21)

ABSTRACT OF THE DISCLOSURE

Arrangements for computing and/or controlling the allocation of generation among sources in a plurality of areas interconnected to form a power pool. The incremental cost of power delivered to a load center of the pool is multiplied by the percent of power delivered by the areas to such load center to give an incremental cost of delivered power at a bus of each area. Each incremental bus cost of delivered power is converted to an incremental cost of delivered power at the associated area's load center which, in turn, is utilized to determine the desired source-generations.

---

This invention relates to a means for the computation and/or control of the allocation of generation as between a plurality of stations interconnected in groups by transmission lines to form separate areas, the areas in turn being interconnected by tie-lines to form a power pool. More particularly, this invention relates to a new and novel means for computing and controlling the generation from each of the group of stations making up the separate areas so as to establish for the power pool a minimum incremental cost of power delivered from each area to the load center of the pool whereby proper operation of the pool is determined for maximum economy.

As the size of the power industry in the United States first began to grow to keep up with consumer demand the power companies constructed their power stations at different locations. These stations which usually had a plurality of generators were then interconnected with transmission lines so that the geographical region served by the power company could have the benefit of the full capacity of their generation capabilities. As power consumption further increased it became necessary to provide interconnections between the individual systems of the companies in order to maintain continuous service to all customers with a minimum capital expenditure for reserve capacity by the companies.

In the past, the separate power companies have generally regulated the flow of power over their interconnecting tie-lines in accordance with prearranged schedules and the power companies themselves have endeavored to maintain the scheduled interchange by meeting their own load requirements. A number of control systems have been developed for the purchase of accomplishing this objective with a maximum economy on the basis of the prearranged interchange between the companies as disclosed in U.S. Patent 2,692,342, issued to C. Nichols et al. on Oct. 19, 1954 and in U.S. Patent 2,773,994, issued to N. Cohn on Dec. 11, 1956. Further improvements which automatically take into account the losses in the transmission lines between stations of an area are disclosed in U.S. Patents 2,836,730, issued to E. D. Early on May 27, 1958, and 2,836,731, issued to W. G. Miller, Jr., on the same date.

It has recently become advantageous for power companies to increase the capacity of their tie-lines to allow a free flow of power in magnitude as may be required to maintain a maximum overall economy for all of the interconnected companies on a continuous basis rather than by prearranged periodic changes in the scheduled amount of power interchanged.

It is, therefore, an object of this invention to provide a new and novel means for determining the desired generation for the stations in the separate areas interconnected to form the power pool so as to constantly maintain maximum economy of operation for the pool.

A further object of this invention is the provision of a new and novel means for determining the desired generation for the generators of the stations in the separate interconnected areas of a power pool as required for maximum economy of operation of the pool while taking into account the transmission losses in the tie-lines interconnecting the areas.

A still further objective of this invention is the provision of a novel system for establishing signals, representing a particular characteristic of each of the several areas making up the power pool, of magnitude indicative of the magnitude of that characteristic necessary to establish equal incremental costs for the power delivered by these areas to the load center of the pool.

A still further object of this invention is the provision of a system for establishing signals indicative of the desired generation for the generators making up the pool as may be required to satisfy the load of the pool while taking into account transmission losses in the tie-lines between areas in establishing area control signals and accounting for the transmission losses in the transmission lines between stations of an area in establishing from said area control signals the control signals for the stations.

Another object of this invention is the provision of a system for economically controlling the output of a plurality of interconnected areas for maximum economy of operation for the pool while each area maintains the ability to respond only to its own load changes.

For clarity, a pool is defined as a group of areas interconnected with tie-lines. An area is defined as a group of stations interconnected by transmission lines and controlled as an entity separate and distinct from other areas. Stations may include one or more generators.

Usually, the areas will be separate economic units as, for example, individual power companies made up of a group of interconnected stations. The area may, however, represent a group of such companies which have a cooperative organization which is itself a separate economic unit from the economic units forming the other areas interconnected with it. For each separate economic unit, it is desirable that the equipment utilized for allocating generation among the several stations of that unit should be so organized that the stations comprising the area, the economic unit, may operate independently of the pool. For this purpose and to minimize the amount of information which must be telemetered to the pool's load dispatching center, it is necessary that the allocation of the total pool generation should first be made on an area basis and then at the several area load dispatching centers the allocation for the particular area can be made on a station basis as well as upon a unit basis.

In carrying out the present invention a means are provided for computing and controlling for a particular load condition the generation of a plurality of generators which are grouped as stations, the stations being interconnected by transmission lines to form separate areas. The areas are in turn interconnected by tie-lines to form a power pool and the computation and control are directed to establishing values of generation for those generators or stations such as to enable the pool to carry its own load at a minimum cost. To carry out one step of this system there is calculated the incremental cost of power at a bus of each of the areas in accordance with both an iterated value for the incremental cost of power delivered to the load center of the pool as well as values of generation associated with generators in the pool and factors taking into account the transmission losses in the tie-lines. Another step is carried out by producing for each generator or station a signal indicative of the value of generation which corresponds to the calculated values for the related area bus costs. Additionally, there are performed the steps of comparing the total of those values of generation for the entire pool and the particular load condition of the pool and further iterating the value of the incremental cost of power delivered to the load center of the pool in a direction tending to bring the total pool generation value toward that required to satisfy the particular load condition at a minimum cost.

The mathematical expressions useful for an understanding of this invention can be derived from elementary differential equation theory which indicates that if:

$C$=$/mwh.=incremental cost of power at a bus
$D$=mw.=power delivered to load
$f$=$/B.t.u.=fuel cost
$F$=$hr.=cost rate
$I$=B.t.u./hr.=heat rate
$G$=mw.=generated power
$\lambda$=$/mwh.=incremental cost of delivering power to a load center
$L$=mw.=transmission losses
$u$=subscript referring to a generating unit of a station
$s$=subscript referring to a station of an area
$a$=subscript referring to an area of a pool
$p$=subscript referring to a pool
$r$=subscript referring to a reference bus then, $$dF_a = \sum_s \frac{\partial F_a}{\partial G_s} dG_s = 0 \qquad (1)$$

and, $$dD_a = \sum_s \frac{\partial D_a}{\partial G_s} dG_s = 0 \qquad (2)$$

for the minimum cost rate at a particular value of load. Equations 1 and 2 may also be written with subscript "$p$" in place of "$a$" and "$a$" in place of "$s$."

By means of the Lagrange technique, multiplying Equation 2 by $\lambda_a$ and substracting from Equation 1, $$dF_a - \lambda_a dD_a = \sum_s \left( \frac{\partial F_a}{\partial G_s} - \lambda_a \frac{\partial D_a}{\partial G_s} \right) dF_s = 0 \qquad (3)$$

therefore, $$\lambda_a = \frac{dF_a}{dD_a} = \frac{\partial F_a}{\partial G_s} \frac{\partial G_s}{\partial D_a} \qquad (4)$$

and since $$C_s = \frac{\partial F_a}{\partial G_s} \qquad (5)$$

then $$\lambda_a = C_s \frac{\partial G_s}{\partial D_a} \qquad (6)$$

Equation 4 may also be written as $$\lambda_a = \frac{dF_a}{dD_a} \frac{dG_a}{dG_a} = \frac{dF_a}{dG_a} \frac{dG_a}{dD_a} \qquad (7)$$

and since $$C_a = \frac{dF_a}{dG_a} \qquad (8)$$

and $$C_s = \frac{\partial F_a}{\partial G_s} \qquad (9)$$

then $$\lambda_a = C_a \frac{dG_a}{dD_a} = C_s \frac{\partial G_s}{\partial D_a} \qquad (10)$$

which by change of subscripts may be converted for use with regard to the pool, $$\lambda_p = C_a \frac{\partial G_a}{\partial D_p} = C_s \frac{\partial G_s}{\partial D_p} = C_\mu \frac{\partial G_\mu}{\partial D_p} \qquad (11)$$

From Equation 10

$$\lambda_a = C_a \frac{dG_a}{dD_a} \qquad (12)$$

and $$C_s = \lambda_a \frac{\partial D_a}{\partial G_s} \qquad (13)$$

and from Equation 11

$$C_a = \lambda_p \frac{\partial D_p}{\partial G_a} \qquad (14)$$

Also, $$\frac{C_s}{f_s} = \frac{dI_s}{dG_s} \qquad (15)$$

for maximum economy at each station having a common fuel the incremental heat rate for each unit should be the same as the incremental heat rate for the station $dI_s/dG_s$ therefore $$G_u = f_n \left( \frac{dI_s}{dG_s} \right) \qquad (16)$$

where $f_n$ denotes a function.

For stations utilizing multiple fuels, maximum station economy is attained when the incremental cost of power for each unit is the same as the incremental cost of power at the station bus.

Therefore, $$C_s = C_\mu = f_u \left( \frac{dI_\mu}{dG_\mu} \right) \qquad (17)$$

For stations where there is no simple means to represent heat rate, it is advantageous to develop, by means of dynamic programming techniques or other mathematical devices, a relationship between station incremental bus cost and the power generated at the station.

Therefore, $$C_s = f_n(G_s) \qquad (18)$$

In all of the above descriptions it is understood that transmission losses are related to generated and delivered power by the laws of energy conservation as expressed by the following equation $$G_p - D_p - L_p = 0 \qquad (19)$$

Therefore, $$1 - \frac{\partial D_p}{\partial G_a} - \frac{\partial L_p}{\partial G_a} = 0 \qquad (20)$$

and $$\frac{\partial D_p}{\partial G_a} = 1 - \frac{\partial L_p}{\partial G_a} \qquad (21)$$

Equation 21 is the more familiar form and is found, with a slight change in notation, in U.S. Patent 2,836,730, issued to E. D. Early, May 27, 1958.

For further objects and advantages of the invention and for a more detailed discussion of the same, reference may be had to the following description taken in conjunction with the accompanying drawings in which.

Figure 1:
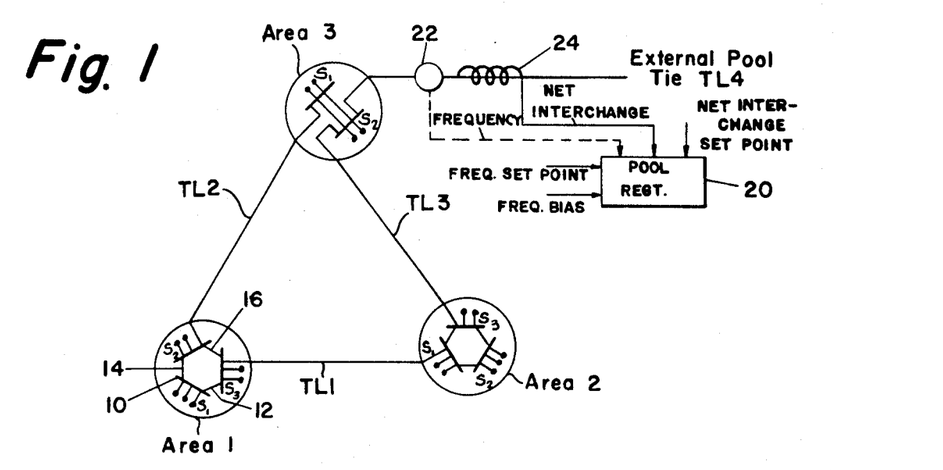
FIG. 1 is a diagrammatic showing of a power pool showing the interconnections of the areas which make it up.

For the purposes of this description it may be assumed that the power pool, which is to be controlled for a maximum economy of delivered power, consists of three areas interconnected as shown in FIG. 1 by tie-lines $TL_1$, $TL_2$ and $TL_3$ so as to form a loop-type of interconnection.

Each of the areas is shown as including a plurality of stations which are interconnected by transmission lines within the area boundaries. For example, area 1 includes stations $S_1$, $S_2$ and $S_3$ which are shown as comprising three generators for station $S_1$ and two generators for both stations $S_2$ and $S_3$. All of the generators of each station are connected to the bus of the station; for example, the three generating units of station $S_1$ are connected to bus 10 of station $S_1$. As shown in area 1, the three stations $S_1$, $S_2$ and $S_3$ are interconnected by transmission lines 12, 14 and 16. To simplify the drawing, the loads in the several areas of FIG. 1 have not been shown but it will be evident to those familiar with electrical transmission and distribution systems that the load pattern in each area may be of a very random nature.

The power pool of FIG. 1 is shown as having a single interconnection with another pool. This interconnection is identified as tie-line $TL_4$ and is shown connected to the station bus of station $S_2$ of area 3.

FIG. 1 also shows diagrammatically the pool requirement measuring assembly 20 whose function is to determine the amount of change in generation required within the pool in order that the pool will maintain its own load and do so at the desired predetermined frequency, usually 60 cycles. In order to make this measurement, the information which is fed into the pool-requirement measuring assembly 20 includes a frequency measurement by frequency-measuring device 22 as well as a measurement of the net interchange of power over tie-line $TL_4$ which may be made with a thermal converter here shown schematically and identified with reference character 24. In addition to the measured frequency and the measured net tie-line interchange with the external pool, the pool requirement measurements must also include a net interchange setpoint, a frequency setpoint and a frequency bias corresponding to an inherent characteristic response of the pool to a frequency change. The pool requirement measuring assembly 20 may consist, for example, of an instrument or system of the type fully disclosed in U.S. Patent 2,688,728, issued to J. B. Carolus on Sept. 7, 1954, or, if desired, it may consist of alternative arrangements for utilizing the same input information in order to arrive at the pool requirement.

Figure 2:
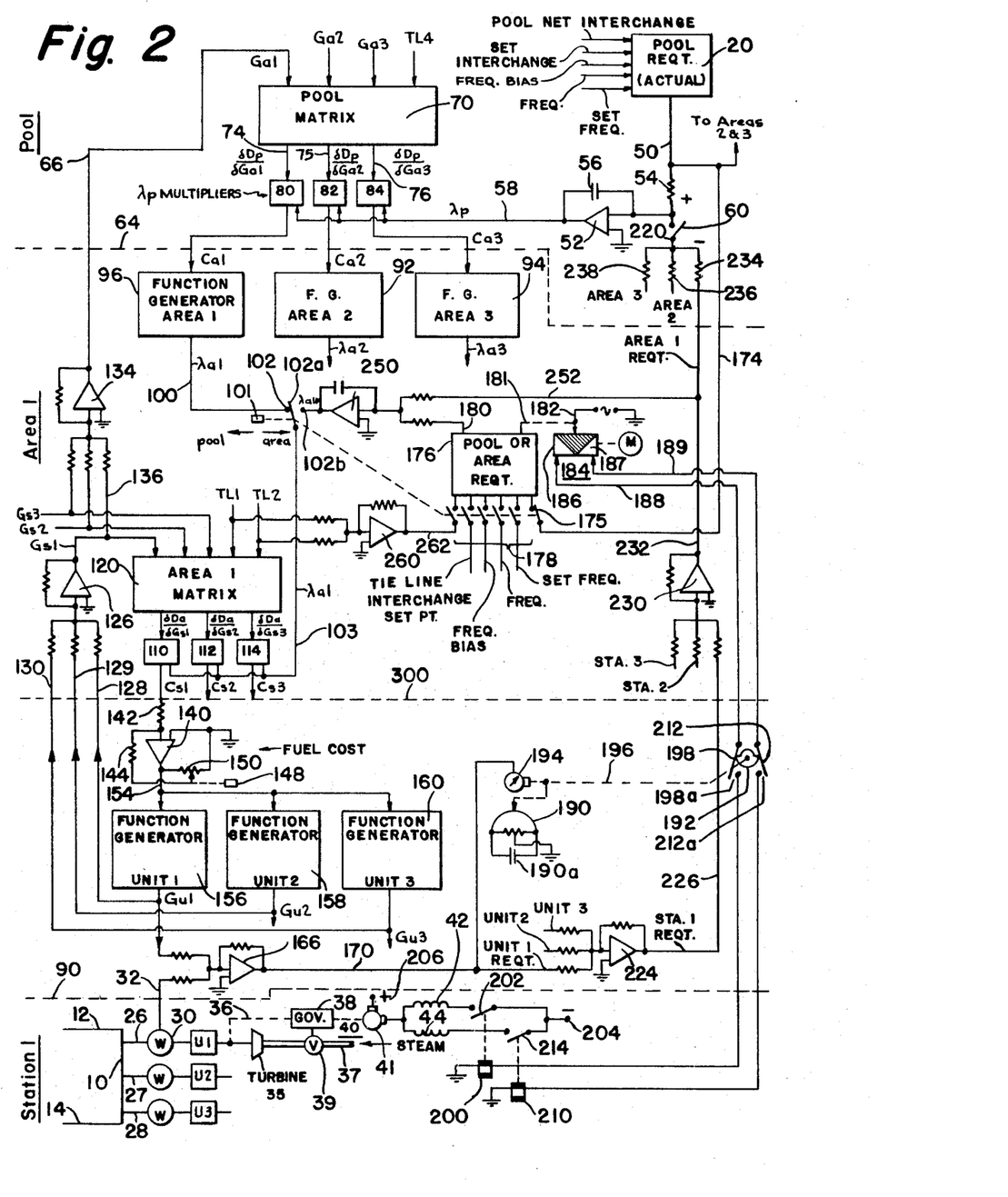
FIG. 2 is a diagram of a preferred embodiment of the novel computing and control system shown partially in block form.

For the purposes of a description of the manner in which the novel computing and control system of FIG. 2 functions, FIG. 2 has been drawn to show the specific equipment and the circuits interconnecting that equipment which are necessary for the computation and control of the generation of a generating unit $U_1$ in station $S_1$ which, as shown in FIG. 1, is in area 1 of the power pool. It will, of course, be evident that the other units of that station as well as the other stations, and the other areas may be controlled similarly.

In FIG. 2 the three generating units of station $S_1$ are shown in block form as $U_1$, $U_2$ and $U_3$. These units are respectively connected by lines 26, 27 and 28 to the station bus 10 and the actual generation of units is measured as by a standard type of wattmeter shown, for example, in line 26 by reference character 30.

The wattmeter 30 supplies to amplifier 166 by way of line 32 a signal indicative of the actual generation of unit 1. The use to which this information is put in the computing and control equipment of FIG. 2 will be referred to subsequently. For the purpose of illustrating the usual manner in which the generation of a generator in a central power station is controlled, the turbine 35 is shown as connected by a mechanical connection to the generator $U_1$ and also by mechanical connection 36 to governor 38. The governor mechanism 38 is, for example, the usual type of flyball governor which operates to control the opening and closing of the turbine control valve 39 in order to throttle the steam flowing through line 37 to turbine 35. The governor 38 has its setting altered by governor motor 40 which is shown as having an armature 41 and two field windings 42 and 44, each of which when selectively energized causes the governor motor to operate in a particular direction. The motor 40 rotates in one direction when "raise" winding 42 is energized and in the opposite direction when the "lower" winding 44 is energized.

The pool requirement measured by the assembly 20 produces on its output line 50 a signal representing the change in generation desired in the pool in order that the load of the pool will be carried by the generation of the pool at the set frequency.

The pool requirement signal is fed to the input of the operational amplifier 52 through the input resistor 54. Operational amplifier 52 for the purposes of integrating the input includes in its feedback circuits a capacitor 56. The output of amplifier 52 on line 58 may be identified as representing $\lambda_p$ which is the incremental cost of power delivered to the load center of the pool as indicated by the previous definitions.

For the purposes of the present discussion we will assume that a switch 60 is open to disconnect other input circuits from amplifier 52 and for the purpose of providing a floating type of control. In this type of control, the generation of the generating units will be constantly changed in the desired direction until the pool requirement becomes zero.

For the purposes of this invention, it is desirable to calculate, for example, at a load dispatching office for the pool the incremental cost of power delivered at a hypothetical bus of each of the interconnected areas. These quantities are identified in FIG. 2 as $C_{a1}$, $C_{a2}$ and $C_{a3}$. It will be evident to those familiar with the mathematical expressions developed previously that the incremental cost of power at that area bus is actually the cost of power at a hypothetical point since the area may, as in the case of area 1 of FIG. 1, have several interconnections with other areas which interconnections do not have a common connecting point with area 1. Likewise, lambda represents the incremental cost of power delivered to a hypothetical load center and as used in this description takes into account the transmission losses.

In FIG. 2 the upper part of the drawing above the dashed line 64 shows the equipment which will normally be in the pool dispatcher's office. Thus, line 66 provides a signal, which represents the generation desired for area A established in a previous step in the computation and identified as $G_{a1}$, telemetered to the pool dispatcher's office. The calculated desired generation for the other areas $G_{a2}$ and $G_{a3}$, as well as the power interchange over the tie-line $TL_4$ must also be fed into a pool matrix 70. This matrix type of circuit in this particular diagram is utilized to compute the quantities $\partial D_p/\partial G_{a1}$, $\partial D_p/\partial G_{a2}$ and $\partial D_p/\partial G_{a3}$, which quantities appear on output lines 74, 75 and 76 respectively. The pool matrix may, of course, have other inputs such as tie-line loads $TL_1$, $TL_2$ and $TL_3$ either to replace the quantities $G_{a1}$ $G_{a2}$ and $G_{a3}$ or in supplement thereto. The output quantities from the matrix are fed by lines 74, 75 and 76 as inputs to separate $\lambda_p$ multipliers 80, 82 and 84 respectively where the quantities are multiplied by the signal $\lambda_p$ which is provided as another input to these multipliers and is obtained from line 58. The computation which is accomplished by the pool matrix 70 and the lambda multipliers 80, 82 and 84 is the multiplication indicated in Equation 14 in the previous mathematical derivations and, as will be evident from Equation 14, the resultant answer or the output of 80, 82 and 84 is the quantity $C_a$ which is the incremental cost of power at the particular area bus, thus $$C_a = \lambda_p \partial D_p / \partial G_a \tag{14}$$

Figure 3:
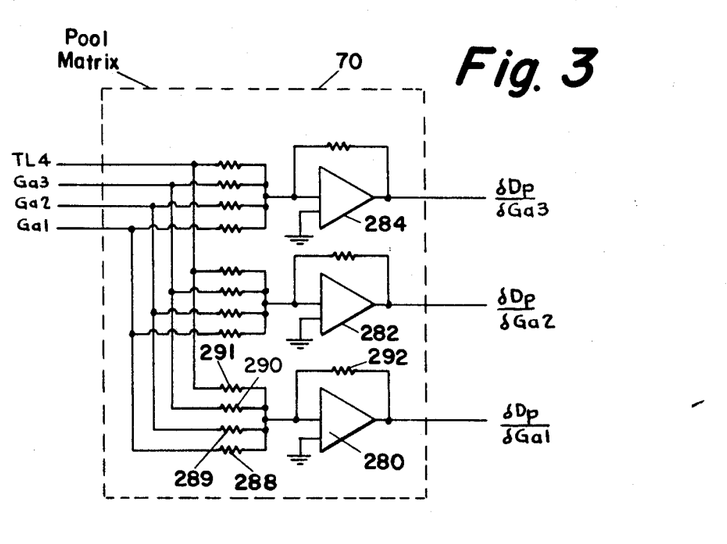
FIG. 3 is a more detailed circuit diagram of the block of FIG. 2 labeled "Pool Matrix"

The pool matrix may be constructed as shown in FIG. 3, later described in detail, and the $\lambda$ multipliers 80, 82 and 84 may be circuits of the type fully disclosed in U.S. patent application Ser. No. 227,900, filed Oct. 2, 1962, by James Paul White, a coemployee of mine, and entitled "Magnetic Multiplier System."

The computing and control equipment which is shown between the dashed line 64 and dashed line 90 in FIG. 2, is that equipment which would desirably be set up in the load dispatcher's office of the particular area, in this case area 1, with the exception of function generators 92 and 94 which would be located in the load dispatcher's office for area 2 and area 3, respectively.

The quantity $C_{a1}$ from lambda-multiplier 80 is telemetered from the pool dispatcher's office to the area dispatcher's office for area 1 in which it is utilized as an input to function generator 96. This function generator, which may be of the type disclosed in U.S. patent application Ser. No. 186,477, filed Apr. 10, 1962, produces from the quantity $C_{a1}$ an output representative of the quantity $\lambda_{a1}$ which represents the incremental cost of the power delivered to the load center of area 1. In order to accomplish this computation the function established by the function generator 96 serves to multiply the input $C_{a1}$ by the quantity $dG_a/dD_a$, which represents the incremental amount of power delivered to the load center of area 1 from the hypothetical bus of area 1. In this connection reference should be had to Equation 12.

$$\lambda_a = C_a dG_a/dD_a \quad (12)$$

As previously mentioned, the output of the function generator 96, which appears on line 100, represents $\lambda_{a1}$. Likewise the outputs of function generators 92 and 94 represent $\lambda_{a2}$ and $\lambda_{a3}$, respectively. If we assume that switch actuator 101 has the movable switch contact 102 in the position shown, namely, in contact with stationary contact 102a, then the quantity $\lambda_{a1}$ is fed as an input to the $\lambda_{a1}$ multipliers 110, 112, and 114 where the quantity $\lambda_{a1}$ is effectively multiplied by the other inputs to these multipliers, namely, $\partial D_a/\partial G_{s1}$, $\partial D_a/\partial G_{s2}$ and $\partial D_a/\partial G_{s3}$. These $\lambda_{a1}$ multipliers may be similar to the $\lambda_p$ multiplier in construction. In order to obtain the inputs to the $\lambda_{a1}$ multipliers, the losses in the transmission lines interconnecting stations 1, 2 and 3 of area 1 of FIG. 1 must be taken into account as by the matrix shown as block 120. The inputs to this matrix must include the desired generation computed for the several stations of the area as well as the power flow over the tie-lines $TL_1$ and $TL_2$ which interconnect area 1 with areas 2 and 3.

The computed desired generation value such as $G_{s1}$ for station 1 of area 1 is computed as by the summing amplifier 126 from the desired generation computed for the three generating units, namely, $G_{u1}$, $G_{u2}$ and $G_{u3}$ which quantities are supplied as inputs to amplifier 126 on lines 128, 129 and 130. The output of amplifier 126 is then fed directly to the area matrix 120 and it is also fed to a summing amplifier 134 by way of line 136 so that it may, by amplifier 134, be summed with the computed desired generation values for the other two stations of the area, namely, $G_{s2}$ and $G_{s3}$ to provide the quantity $G_{a1}$ on line 66.

The other inputs to the matrix 120, namely, the quantities $TL_1$, $TL_2$ which represent the power flow over the tie-lines to and from areas 2 and 3 would normally be telemetered to the area dispatcher's office by well known means not shown in FIG. 2.

The outputs of the $\lambda_{a1}$ multipliers 110, 112 and 114 will, therefore, as shown in FIG. 2, correspond with the quantities $C_{s1}$, $C_{s2}$ and $C_{s2}$ which, respectively, represents the incremental cost of power at the busses of stations $S_1$, $S_2$ and $S_3$. The incremental cost for stations $S_2$ and $S_3$ will be sent to the equipment associated with those stations.

In FIG. 2 there is shown only that equipment which is associated with station $S_1$. Like equipment will be provided for the remaining stations. Thus the cost represented by the quantity $C_{s1}$ is fed to an input of operational amplifer 140 which has an input resistor 142 and a feedback resistor 144. In addition, the feedback through resistor 144 is subject to modification by adjustment of a knob 148 in accordance with the cost of the fuel being used at station $S_1$. This adjustment serves to tap off from output resistor 150 a portion of its potential so as to modify the feedback for the amplifier 140 and thereby produce as an output from operational amplifier 140 a quantity which represents the incremental heat rate for the station which may be expressed as $dI_s/dG_s$.

For maximum economy within station $S_1$ the incremental heat rate for each of the units $U_1$, $U_2$ and $U_3$ of the station should be the same, namely, the incremental heat rate of the station: thus the output from operational amplifier 140 which appears on line 154 is supplied as an input to each of the function generators 156, 158 and 160.

The function generators 156, 158 and 160 may be of a type similar to the function generators 92, 94 and 96 for areas 1, 2, and 3, and therefore capable of providing an output which is the desired function of the incremental heat rate. The outputs $G_{u1}$, $G_{u2}$ and $G_{u3}$ then represent, respectively, the desired generation for the particular unit as indicated by Equation 16.

$$G_u = f_n\left(\frac{dI_s}{dG_s}\right) \quad (16)$$

The quantity $G_{u1}$ is shown as an input to the summing amplifier 166 where it is subtracted from the actual generation signal supplied by way of line 32. The difference between these two quantities, in controlling the magnitude and polarity of the output of amplifier 166 on line 170, represents the unit requirement or, in other words, the change and direction of change of generation desired for that unit in order to establish in the area and in the pool the generation required to meet with maximum economy the pool requirement established as a signal on line 50.

The unit requirement established on line 170 for unit $U_1$ represents the desired change in generations corresponding with an incremental cost of delivered power to the load center of the pool, namely, $\lambda_p$ as established by the signal on line 58. As is well known to those familiar with the manner in which simultaneous equations may be solved by iterative techniques, the quantity $\lambda_p$ may be iterated for the purposes of establishing the desired generation values for the units of the pool which will bring the sum of the actual generation values of all of the units to equality with the load in the pool. Thus, when it is desired to utilize a floating type control of the kind thus far described, the quantity $\lambda_p$ may be iterated until the pool requirement returns to zero. More particularly, as long as there is an output signal on line 50, the quantity $\lambda_p$ represented by the signal on line 58 will be constantly changing as a result of the integrating effect of amplifier 52. This, in turn, will vary the generation in manner explained until the quantity $\lambda_p$ is reduced to zero.

This constantly changing value of $\lambda_p$ in the analog type of system shown in FIG. 2 in accordance with this invention is to be considered as equavalent to iteration in a digital execution since, although not occurring at discrete spaced periods of time, the quantity $\lambda_p$ is nevertheless changing in value and the change continues until the computation is complete or, in other words, until the solution converges.

As mentioned previously, with the switch 60 associated with amplifier 52 in an open position, the system as shown in FIG. 2 is a floating type of system and $\lambda_p$ will continue to change until the pool requirements signal on line 50 is reduced to zero. This will, of course, occur only when the inputs to the pool requirement measuring instrument 20 are such as to indicate that the generation of the pool has satisfied the load in the pool and the net interchange is at its set value and the frequency does not deviate from its set value beyond that allowed by the applied frequency bias.

The pool requirement signal which appears on line 50 is telementered to the dispatcher's office in each area.

Area 1 receives this signal over line 174. This line is connected through the closed switch element 175 to the requirement instrument 176 which in this case would be a pool requirement repeating instrument. With switch actuator 101 in the position shown, the switch 175 is closed and the five switches which may be identified as switches 178 are all open. The requirement instrument 176 thus acts as a repeater for the pool requirement quantity which it provides as a signal on line 180.

The pool requirement repeating instrument 176 also has a mechanical output applied by mechanical coupling 181 to move the contact 182 of pulse generator 184 in accordance with the pool requirements. The pulse generator 184 is here shown for simplification of illustration as a drum rotated by a motor with the drum having conducting segments 186 and 187 with an intervening nonconductive segment. The pulse generator 194 with contact 182 in a position to the left of its mid-position functions to send raise pulses over line 188 whose duration will vary in dependence upon the position of the contact 182. Similarly, lower pulses are sent over line 189 when the contact 182 is positioned to the righthand side of the pulse generator 184 thus representing the need for, and magnitude of, pulsed lowering of the generation.

In order that there will be no change in the output of any of the generators in a direction which will not be in accordance with the overall pool requirement as determined by instrument 20, the governor motor 40 is actuated by "raise" or "lower" pulses sent on lines 188 and 189. These pulses are selectively allowed to pass to unit 1 in dependence upon the polarity of the unit requirement signal on line 170. As shown in FIG. 2, the unit-requirement signal on line 170 is changed into a mechanical output for positioning the cam 192 by means of a center tapped slidewire 190 which is supplied by a source 190a and by the operation of the balancing mechanism shown symbolically at 194, which balancing mechanism is mechanically coupled to the cam 192 by the mechanical coupling 196.

When the signal on line 170 indicates that the unit requirement for unit $U_1$ is for an increase in generation, the cam 192 is rotated by rebalancing mechanism 194 in a direction to cause the cam operated switching element 198 to close upon its fixed contact 198a thus allowing any raise pulses being supplied on line 188 to energize the relay 200 so as to close the relay contact 202 to supply power from the negative side 204 of a source of power through the relay contact 202 to the "raise" winding 42 and armature 41 of the governor motor 40 to the plus side 206 of the source. As previously indicated, the "raise" pulses on line 188 will not be present unless the pool requirement is such as to call for an increase in generation as would be evidenced by moving of the contact 182 to the left on the pulse generator 184.

Similarly, when the pool requirement calls for a decrease in generation, the pulses which will then appear on line 189 will be allowed to energize relay 210 if the unit requirement represented by the signal on line 170 and hence the mechanical position of cam 192 are such that the cam operated contact 212 is closed upon its fixed contact 212a. The resulting operation of relay 210 serves to close the relay contact 214 allowing the power to flow in the "lower" winding 44 of governor motor 40 which, of course, has the effect of adjusting the governor 38 in a manner which will tend to decrease the opening in valve 39 and hence decrease the flow of steam in line 37 thus decreasing by way of a decreased input to turbine 35 the output of generator $U_1$.

To change the operation of the system of FIG. 2 from a floating control (switch 60 in the open position) the switch 60 is closed. The system then operates as a closed-loop type of control so that the computation of the desired generation for each of the units is carried on independently of the response of the generators to the computed changing values of desired generation. In order to provide such a closed-loop system it is necessary that the pool requirement signal on line 50 be compared with the sum of the calculated area requirement values as computed for the three areas of the pool and that the iteration of $\lambda_p$ should be carried on only when such a comparison indicates a difference between those quantities. It is thus necessary to establish at amplifier 52 at the pool dispatcher's office, as on line 220, a quantity representing the sum of the computer area requirement values computed for all of the generators in the pool. Therefore, it is necessary that the unit requirements should all be added. This is accomplished by summing amplifier 224 which has as one of its inputs the unit requirement from line 170, the other inputs being the unit requirements established for units $U_2$ and $U_3$. There is thus produced as an output of amplifier 224 on line 226, a signal representing the required generation change for station $S_1$. This quantity is summed with the station requirements for stations $S_2$ and $S_3$ of area 1 as by the summing amplifier 230 which then supplies as an output at line 232 the generation requirement for area 1. This generation requirement is telemetered to the pool dispatcher's office where it is summed with the area requirements established for areas 2 and 3 and compared with the pool requirement. It will be remembered that the pool requirement is applied as an input to amplifier input resistor 54. The area requirement values represented by input signals applied to input resistors 234, 236 and 238 have their polarities shown as negative, that is, opposite to the polarity of the pool requirement signal which is shown as being positive. Thus, amplifier 52 provides an output signal $\lambda_p$ proportional to the integral with respect to time of that difference.

In brief summary, it is emphasized that the method and system of the present invention produces an economic distribution of the power required in a power pool to establish a minimum cost for the delivery of that power to the load or load center of the pool. The load center for the power pool of FIGS. 1 and 2 may be an arbitrarily selected point to meet the definition of lambda as used in the equations above set forth. The power pool of FIG. 1 is made up of a plurality of stations, each having a plurality of generating units. In each area, there may be present long transmission lines. Some areas may have short transmission lines, in which case transmission losses for a particular area need not be taken into account in the determination of the desired generation values for the generating units of that area.

The present invention is to be contrasted with other proposals in that there is first established a value for the common incremental cost of delivering power by the pool to a selected point in the pool, which has been referred to as the load center. Having thus established the value for $\lambda_p$, as on line 58 of FIG. 2, there is then developed a relationship between the foregoing incremental cost of delivered power $\lambda_p$ and values $C_{a1}$, $C_{a2}$, and $C_{a3}$ indicative of the incremental cost of power at a particular point or hypothetical bus in each of the areas in accordance with the transmission losses in the tie-lines $TL_1$, $TL_2$ and $TL_3$. In order that there may be now realized from each area, generation from the several units of magnitude which will result in a minimum cost or the delivery of power by the pool to its load center (insofar as each area is concerned) there is now developed from the incremental area cost values $C_{a1}$, $C_{a2}$ and $C_{a3}$ values $G_{u1}$, $G_{u2}$ and $G_{u3}$ indicative of the required output of the power sources within the area. These desired generation values through the function generators 156, 158 and 160 are then established in accordance with the relative efficiencies of the sources and which may or may not take into account the transmission losses in each area as by area matrix 120 provided for area 1.

With the above summary of the invention in mind, it will be seen that the method steps are readily performed by the analog equipment thus far described. Those skilled in the art are familiar with computers of the digital type not only for the computation of transmission line losses, desired generation and incremental cost of generation, but also their utilization in control systems. Thus, digital computers may be programmed by those skilled in the art to carry out the several steps above described and their outputs utilized for the establishment of the desired values at the generating units to meet the above requirements.

In addition to the ability to operate as a floating control system or as a closed-loop system the arrangement shown in FIG. 2 also has the flexiiblity of allowing each of the areas to operate independently of the pool. This flexibility is a desirable feature in that it allows for independent operation of the areas in the event that the pool computing equipment should fail to operate properly or in the event the separate areas should find, for emergency or other reasons, that it becomes desirable to control the generation in such area so as to meet its own load and any scheduled interchange with other areas. Such independent operation is accomplished by actuating the switch actuator 101 to the right for "area" operation rather than "pool" operation. This actuation serves to disconnect or open switch 175 at the same time that it causes the movable switch contact 102a to close on the fixed contact 102b so that $\lambda_{a10}$ is then provided as an output from integrating amplifier 250 which will serve to change $\lambda_{a10}$ or, in other words, iterate $\lambda_{a10}$ as long as the area requirement as established on line 180 by the measuring instrument 176 does not correspond with the computed area requirement as established on line 152 which is connected to line 232. The actuation of switch actuator 101 to the right for area operation not only disconnects the pool requirement signal from the requirement instrument 176 but it also serves to connect the lines 178 which feed in all of the inputs required for the measurement of area requirement, namely, tie-line interchange, tie-line interchange setpoint, frequency bias, actual frequency and set frequency. With such input information, the instrument 176 serves to measure area requirement or, in other words, that required change in generation for the particular area as necessary to meet its own load at the set frequency. The actuation of the contact 182 is then in accordance with area requirement rather than pool requirement and the control continues as previously described with the exception that it is based upon the criteria of equality between the calculated requirement or generation change for all of the units of the area and the measured area requirement as established from the measured area parameters.

In producing one of the quantities above mentioned as inputs to the area requirement instrument 176, a summing amplifier 260 provides a signal over line 262 which is the sum of the power interchange over tie-lines $TL_1$ and $TL_2$ to the other areas and thus represents the net interchange with area 1.

In FIG. 3 the pool matrix 70 is shown in more detail in order to illustrate one arrangement which may be used for the computations which the matrix must accomplish. In FIG 3 each of the inputs $G_{a1}$, $G_{a2}$, $G_{a3}$ and $TL_4$, which represent the generation of the three areas and the tie-line interchange of the pool with an external pool, is supplied as inputs to summing amplifiers 280, 282 and 284 through the respective input resistors, as for example 288, 289, 290 and 291 shown for amplifier 280. The input resistors will desirably be arranged to have values which in combination with the feedback resistor 292 provide an output which is representative of the sum of the several inputs multiplied by different constants which constants represent the incremental transmission loss factors. The function of this matrix and the computations there accomplished are well known to those familiar with the established techniques for taking into account transmission losses and the computation of desired generation values. This background theory may be better understood by reference to U.S. Patent 2,836,730, issued to E. D. Early on May 27, 1958, as well as to the literature there referenced.

Since the computations accomplished by the area matrix 120 of FIG. 2 are similar in nature to the pool matrix 70, an arrangement similar to FIG. 3 may be utilized for the area computations.

Figure 4:
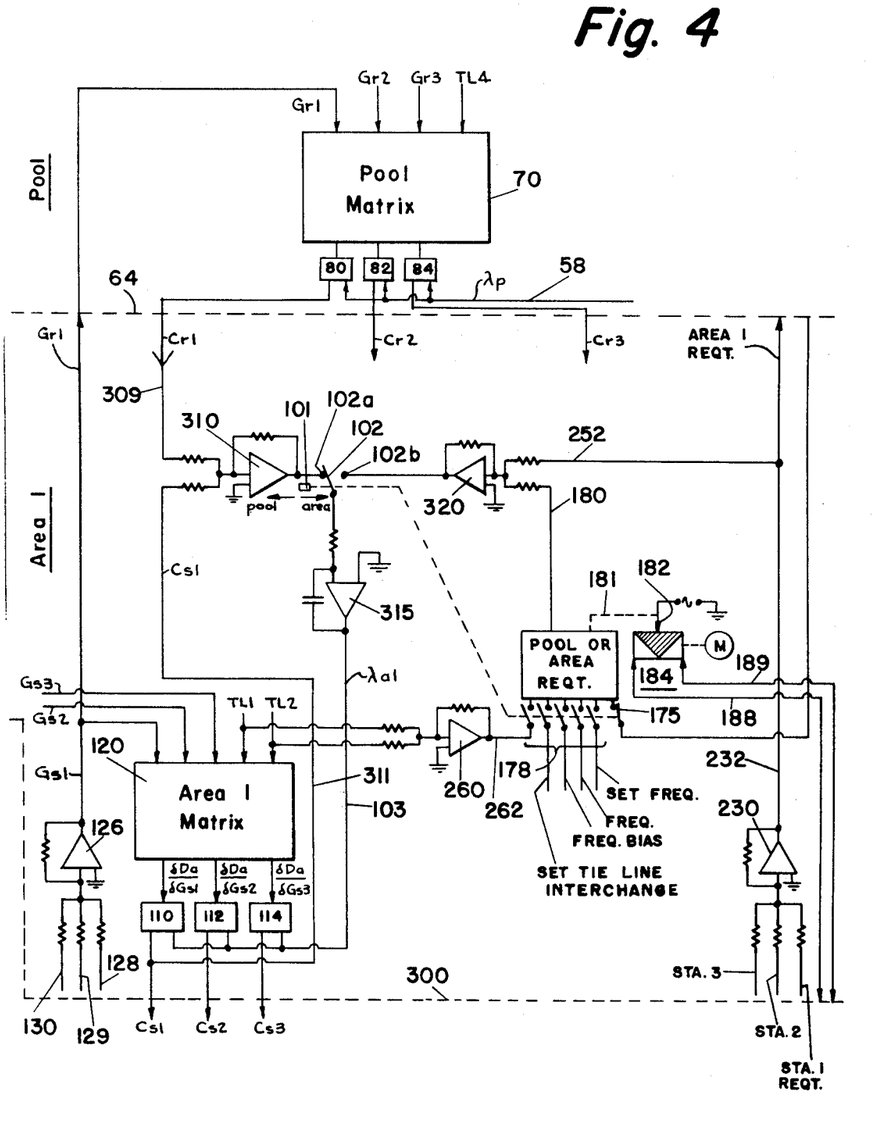
FIG. 4 is a partial diagram showing a variation of the system of FIG. 2.

In FIG. 4 there is shown a variation of the computing and control system of FIG. 2 with the parts differing from those of FIG. 2 identified by reference characters in the 300 series. This variation, instead of utilizing in the pool matrix 70 the computed desired generation for each of the areas, utilizes only the computed desired generation for a particular station of each of the areas. The bus of that particular station is, in FIG. 4, considered to be a reference bus and the cost computation made by the pool matrix 70 and the $\lambda_p$ multipliers, not shown, then results in signals which are identified as $C_{r1}$, $C_{r2}$ and $C_{r3}$. The signal $C_{r1}$ represents the incremental cost of power at the reference bus of station $S_1$ and the signals $C_{r2}$ and $C_{r3}$ represent cost figures associated with a particular station bus in each of the remaining areas. If desired, the reference bus may be chosen as something other than a station bus, for example, it may be a tie-line of the particular area or other similar points.

In FIG. 4, which is a partial diagram only, there is shown in detail at the area dispatcher's office that portion of the equimpent which is above the dashed line 300.

Since the system of FIG. 4 does not utilize the function generators 92, 94 and 96 of FIG. 2, another means including integrating amplifier 315 is utilized for obtaining on line 103 a signal indicative of $\lambda_{a1}$. In the system of FIG. 4, when the switch operator 101 is in the position shown, for obtaining pooled operation, the reference bus cost signal $C_{r1}$ is compared with the station bus cost signal $C_{s1}$ by operational amplifier 310. It will be evident that the cost figures $C_{r1}$ and $C_{s1}$ are representative of the incremental cost of power at a bus of station 1. The cost $C_{r1}$ is computed on the basis of the pool parameters similarly to $C_{a1}$ of FIG. 2 and $C_{r1}$ is telemetered over line 309 while the cost $C_{s1}$ is computed on the basis of the area parameters and appears as an output on line 311 from $\lambda_a$ multiplier 110.

Whenever the cost $C_{r1}$ and the cost $C_{s1}$ differ, the output from amplifier 310 through the closed contacts 102 and 102a provides an input to integrating amplifier 315 which in turn produces a constantly changing output on line 103 representative of $\lambda_{a1}$. Thus $\lambda_{a1}$ is continually changed until the computed cost figures $C_{r1}$ and $C_{s1}$ are equal.

When it is desired to operate on an area basis, that is, when each area desires to control its own generation to maintain its own load, the switch operator 101 is placed in the right-hand area position and the contacts 102 and 102b are closed as has been previously described. Under that condition, the input to amplifier 315 is taken from the output of summing amplifier 320 which compares the inputs received over lines 180 and 252 respectively representative of the measured area requirement and the computed area requirement. Thus, during area operation the signal on line 103 representing $\lambda_{a1}$ is continually changed or iterated in response to any difference between the computed area requirement and the measured area requirement.

Other than the differences pointed out above, the system shown in FIG. 4 operates in a manner similar to that described for FIG. 2.

A still further variation of the system of FIG. 2, which may be utilized in order to make unnecessary the separate function generators 92, 94 and 96, may be constructed by incorporating in the matrix 120 of FIG. 2 additional constants for taking into account those factors normally taken into account by the function generators 92, 94 and 96. With such an arrangement, the $\lambda_{a1}$ signal on line 103 is replaced by a signal representative of the cost $C_{a1}$ and the $\lambda_{a1}$ multipliers 110, 112 and 114 are then equal-cost multipliers rather than equal-lambda multipliers.

Along with the above described modifications of FIG. 2, other modifications which may be utilized within the scope of this invention will be evident to those skilled in the art. Such modifications may, for example, include arrangements where actual generations are used as inputs to either or both of the matrices 70 and 120 in place of the computed desired generation values which are used in FIG. 2 as may be convenient according to the limitations as to what quantities may be telemetered to the area and pool dispatchers' offices.

The type of control which is effected in response to the computed values of unit requirement may differ from that shown in FIG. 2 in dependence upon the requirements of the power system in connection with which the system of the present invention is utilized. The control may, for example, utilize the well known proportional and reset actions which have previously been applied to generators in central power stations when it is necessary to provide not only a sustained but also a fringe response.

What is claimed is:

1. In a system for controlling the generation of a plurality of generators interconnected in groups by transmission lines to form separate areas which are in turn interconnected by tie-lines to form a power pool, the combination of pool matrix means having circuit elements for producing from signals representing values of generation desired for said areas other signals representing the incremental percent of power delivered corresponding with the losses in said tie-lines, means for multiplying said other signals by a signal representing a common value of incremental cost of power delivered to the load center of said pool to produce a separate signal for each of said areas representing the incremental cost of power delivered at the bus of that area, function generator means for each of said areas for producing from the bus cost signal for said area a signal representing a common value for the incremental cost of power delivered to the load center of that area, matrix means in each of said areas having circuit elements for producing from signals representing values of generation desired for the stations of that area other signals representing the incremental percent of power delivered corresponding with the losses in the transmission lines of that area, means for multiplying said last mentioned other signals by said signal representing the common value for incremental cost of power delivered to the load center of the respective area to produce a separate signal for each station of the area representing the incremental cost of power at the bus of that station, means including a separate function generator for each generator of the stations in said areas for producing from said station bus cost signals a signal representing the value of desired generation for each of said generators of the stations, means for totalizing the last named signals for each of said stations to provide inputs to said area matrix means, means for totalizing said area matrix inputs for each area to provide inputs to said pool matrix means, means for comparing the actual generation of each of said generators and the computed value of desired generation to produce a signal corresponding to the change requirement for the generation of the corresponding generator, means for combining the said requirement signals for said generators to produce a computed value of pool requirement, means for measuring the actual value of pool requirement, means for comparing said actual value and said computed value of pool requirement and operable to change said value of incremental cost of power delivered to the load center of said pool in direction to reduce the difference between said pool requirement as computed and said pool requirement as measured, means responsive to said measured pool requirement to produce control pulses of one sense or another in accordance with the sense of said requirement, and means operable in response to said change requirement for each of said generators to allow said control pulses to change the generation of said generators in direction tending to reduce said measured pool requirement toward zero.

2. In a power pool including a plurality of areas respectively having one or more stations with generating units and interconecting to form the power pool, a system for computing the changes in generation required for overall maximum economy of operation of the pool comprising means responsive to the change in total generation required of the pool for producing a first signal ($\lambda_p$) representative of a common incremental cost of power delivered to the load center of said pool from said areas, means responsive to the respective generations ($G_{a1}$, $G_{a2}$, etc.), of said areas to produce a plurality of second signals ($\partial D_p/\partial G_{a1}$, $\partial D_p/\partial G_{a2}$, etc.), respectively representative of that fraction of the generation change which is delivered to the load center of the pool from a corresponding area, means for producing from said first and second signals a plurality of third signals ($C_{a1}$ $C_{a2}$, etc.; or $C_{r1}$, $C_{r2}$, etc.) respectively representative of the incremental cost of power at a bus of a corresponding one of the areas, and means responsive to said third signals for computing the desired values ($G_{u1}$, $G_{u2}$, etc.) of generation for generating units of respective areas.

3. A system as in claim 2 in which the first-named means is additionally responsive to the summation of computed unit-requirement signals and which additionally includes means responsive to the differences between actual generations of the respective units and signals corresponding with computed desired values of generation of said units to produce the computed unit-requirement signals.

4. A system as in claim 2 in which the means for computing desired values of generation for units of said areas includes function generator means for each of said areas responsive to said third signals ($C_{a1}$, $C_{a2}$, etc.) to produce signals ($\lambda_{a1}$, $\lambda_{a2}$, etc.) representing a common value for the incremental cost of power delivered to the load centers of the areas.

5. A system as in claim 4 in which the means for computing the desired values of generation for units of said areas includes in each of said areas matrix means having circuit elements for producing from signals ($G_{s1}$ et seq.) representing the values of generation desired from stations of that area, the additional signals ($\partial D_a/\partial G_{s1}$, $\partial D_a/\partial G_{s2}$, etc.), representing the fractions of the generation produced at said stations of the area which is delivered to the load center of the area.

6. A system as in claim 5 in which the means for computing the desired values of generation for units of each of said also includes means for multiplying each of said additional signals ($\partial D_a/\partial G_{s1}$, $\partial D_a/\partial G_{s2}$, etc.), by a signal ($\lambda_{a1}$) representing the common value for incremental cost of power delivered to the load center of the respective area to produce for each station of the area a separate signal ($C_{s1}$, $C_{s2}$, etc.) representing the incremental cost of power at the bus of that station.

7. A system as in claim 6 in which the means responsive to the third signals for computing desired values of generation for units of said areas also includes
means including a separate function generator for each generating unit of the station for deriving from the station bus cost signale ($C_{s1}$, $C_{s2}$, etc.), a signal ($G_{u1}$, $G_{u2}$, etc.) representing the desired value of generation of the associated unit.

8. A system as in claim 3 additionally including
a plurality of means respectively responsive to said computed unit-requirement signals and effective to change the input of the corresponding generating unit in sense to reduce the unit-requirement signal.

9. In a power pool comprising generating sources interconnected in groups by transmission lines to form a plurality of separate areas of the pool, a system for producing signals ($G_{u1}$ et seq.) representative of the source generations required for overall maximum economy of operation of the pool comprising
means for producing for the areas corresponding first signals ($\partial D_p/\partial G_{a1}$, $\partial D_p/\partial G_{a2}$, etc.), each representing the incremental percent of power delivered to the load center of the pool,
means for producing a second signal ($\lambda_p$) representing a value for a common incremental cost of delivered power to said load center,
means for combining said second signal with said first signals to produce third signals ($C_{a1}$, $C_{a2}$, etc., or $C_{r1}$, $C_{r2}$, etc.), each representing the incremental cost of power delivered to a point in a corresponding area of the pool, and means for modifying each of said third signals by one or more signals respectively representing the percent of power ($\partial D_a/\partial G_{s1}$, $\partial D_a/\partial G_{s2}$, etc.), delivered to the load center of the corresponding area, fuel cost, and incremental heat rate to produce the aforesaid signals ($G_{u1}$, $G_{u2}$, etc.), representing the source generations affording maximum overall economy of operation of the pool.

10. A system as in claim 9, additionally including means for
producing signals respectively representing the actual generation of individual sources,
means for producing a signal representing the pool requirement, and
means for varying said second signal ($\lambda_p$) in response both to said pool-requirement signal and to the differences between said actual generation signals and signals ($G_{u1}$, $G_{u2}$, etc.), representing the desired values of source generations for maximum operation economy of the pool.

References Cited

UNITED STATES PATENTS

| | | | |
|---|---|---|---|
| 2,871,374 | 1/1959 | Early | 235—151.21 X |
| 3,114,037 | 12/1963 | Brownlee | 235—151.21 X |
| 3,117,221 | 1/1964 | Kirchmayer | 235—151.21 X |
| 3,229,110 | 1/1966 | Kleinbach et al. | 235—151.21 X |

MALCOLM A. MORRISON, *Primary Examiner.*

J. F. RUGGIERO, *Assistant Examiner.*